United States Patent [19]

Imamura

[11] Patent Number: 5,046,384
[45] Date of Patent: Sep. 10, 1991

[54] SHIFT CONTROL SYSTEM FOR AUTOMATIC POWER TRANSMISSION

[75] Inventor: Hiroyuki Imamura, Shizuoka, Japan
[73] Assignee: Jatco Corporation, Shizuoka, Japan
[21] Appl. No.: 475,273
[22] Filed: Feb. 5, 1990
[51] Int. Cl.$^5$ ............................................. B60K 20/02
[52] U.S. Cl. .................................................... 74/866
[58] Field of Search ........................................... 74/866

[56] References Cited

U.S. PATENT DOCUMENTS

| | | | |
|---|---|---|---|
| 3,750,495 | 8/1973 | Ito et al. | 74/866 |
| 4,222,292 | 9/1980 | Will et al. | 74/866 |
| 4,228,700 | 10/1980 | Espenschied et al. | 74/866 |
| 4,266,447 | 5/1981 | Heess et al. | 74/866 |
| 4,730,519 | 3/1988 | Nakamura et al. | 74/866 |
| 4,744,031 | 5/1988 | Takeda et al. | 74/866 |
| 4,841,813 | 6/1989 | Fujiwara et al. | 74/866 |
| 4,885,960 | 12/1989 | Maeda et al. | 74/866 |
| 4,893,527 | 1/1990 | Furusawa et al. | 74/866 |
| 4,893,701 | 1/1990 | Isono et al. | 74/866 |
| 4,930,375 | 6/1990 | Yamamoto et al. | 74/866 |

Primary Examiner—Allan D. Herrmann
Assistant Examiner—Ryan W. Massey
Attorney, Agent, or Firm—Ronald P. Kananen

[57] ABSTRACT

A shift control system for an automatic power transmission employs an electrically operable timing control valve. The timing control valve is disposed in a second pressure line connected to a second frictional element, which second pressure line is connected to a first pressure line connected to a first frictional element. The timing control valve is designed to be switched between a first position for shutting-off the fluid communication between the first pressure line to the second frictional element and a second position for establishing fluid communication therebetween. The timing control valve is operated by a control signal from an electric or electronic control unit which provides the control signal for the timing control valve for operating the latter with a given lag time from starting of variation of pressure in the first frictional element.

11 Claims, 3 Drawing Sheets

SHIFT CONTROL SYSTEM FOR AUTOMATIC POWER TRANSMISSION

BACKGROUND OF THE INVENTION

1. Field of the Invention

The present invention relates generally to a shift control system for an automatic power transmission for an automotive vehicle. More specifically, the invention relates to a shift control system which has a capability of controlling an appropriate lag time from entry of a shifting command to an actual occurrence of a variation of a transmission speed ratio.

2. Description the Background Art

Japanese Patent First (unexamined) Publication (Tokkai) Showa 57-144338 discloses one example of a shift control system for an automatic power transmission. The disclosed shift control system includes a 3-2 timing valve. The 3-2 timing valve controls drain speed of a working fluid in a third speed servo release chamber of a hydraulic servo device in a band brake device. In the known hydraulic circuit, a control pressure is supplied to the third speed servo release chamber and to a third speed clutch through a common hydraulic line. The 3-2 timing valve is disposed in the line connected to the third speed servo release chamber in a parallel relationship with a flow restriction orifice. The 3-2 timing valve establishes and blocks a by-pass line by-passing the orifice. With the shown construction, the 3-2 timing valve is held open to establish fluid communication through the by-pass line for rapidly draining pressure in the third servo release chamber, when vehicle speed is relatively low. On the other hand, at a relatively high vehicle speed, the 3-2 timing valve is maintained at a shut-off position for blocking fluid communication through the by-pass line. As a result, the pressure in the third speed servo release chamber is drained via the flow restriction orifice. By this, a lag time from entry of a shifting command to engagement of band brake can be provided.

However, timing adjustment to be performed by the conventional shift control system set forth above is not at all completely satisfactory. Namely, when the 2-3 shift valve is switched into the second speed position, pressure applied to the clutch is started to be drained. Simultaneously, the pressure in the third speed servo release chamber is started to be drained. Draining of the pressure in the third speed servo release chamber is started irrespectively of the valve position of the 3-2 timing valve. Therefore, draining is started at the identical timing, i.e. simultaneously with draining of pressure applied for the clutch, when the 3-2 timing valve is in a open position to establish fluid communication via the by-pass line and when the 3-2 timing valve is in a shut-off position to block fluid communication via the by-pass line. If the vehicle speed is relatively high to place the 3-2 timing valve at the shut-off position, the pressure in the third speed servo release chamber is drained via the flow restriction orifice for a lower drain speed. Therefore, the speed of lowering of the pressure in the third speed servo release chamber becomes lower than that of the clutch. As result, a difficulty is encountered to provide a sufficient lag time between releasing of clutch and engaging of the band brake. This further results in difficulty providing a sufficient period to maintain a line pressure at a transition neutral pressure. This degrades a shift feeling of the power transmission upon variation of the speed ratio.

In order to solve the aforementioned problem, Japanese Patent First Publication (Tokkai) Showa 63-96345 discloses an improvement of the shift control system, in which a one-way valve is provided for controlling fluid flow of the working fluid. In the disclosed system, the control pressure is directly supplied from one switching valve to one frictional element, and the control pressure from the one switching valve is supplied to the other frictional element via the one-way valve. The timing valve is provided in the line for the other frictional element. With such construction, if the pressure in the aforementioned one frictional element becomes higher than that in the other frictional element, the fluid pressure difference becomes small since the pressure drained from the one frictional element flows into the other frictional element via the one-way valve. This makes flexibility of adjustment of the timing more limited.

SUMMARY OF THE INVENTION

Therefore, it is an object of the present invention to provide a shift control system for an automatic power transmission, which can solve the drawback in the conventional system.

Another object of the invention is to provide a shift control system which can appropriately adjust operation timing of a plurality of frictional elements in the power transmission.

In order to accomplish the aforementioned and other objects, a shift control system, according to the present invention, employs an electrically operable timing control valve. The timing control valve is disposed in a second pressure line connected to a second frictional element, which second pressure line is connected to a first pressure line connected to a first frictional element. The timing control valve is designed to be switched between a first position for shutting-off the fluid communication between the first pressure line to the second frictional element and a second position for establishing fluid communication therebetween. The timing control valve is operated by a control signal from an electric or electronic control unit which provides the control signal for the timing control valve for operating the latter with a given lag time from starting a variation of pressure in the first frictional element.

According to one aspect of the invention, a shift control system for an automatic power transmission comprises:

gear means including a plurality of gears which have variable rotating states, for establishing a plurality of transmission speed ratios;

a first friction means, associated with the gear means and having variable states between an engaged state and a released state, for varying a rotational state of the gears a second friction means, associated with the gear means in cooperation with the first friction means and having variable states between the engaged state and the released state, for establishing a plurality of speed ratios in combination with the states of the first friction means;

a first hydraulic means, associated with the first friction means, for varying a state thereof between the engaged state and the released state;

a second hydraulic means, associated with the second friction means, for varying the state thereof between the engaged state and the released state;

an electric control network monitoring preselected transmission shifting control parameters and selecting one of transmission speeed ratio adapted to the vehicle driving condition represented by the control parameters for operating the first and second hydraulic means, the control network supplying a first control signal for the first hydraulic means for operating the latter and a second control signal for the second hydraulic means operating the latter with a given delay period from supply of the first control signal so as to provide an overlapping state of the first and second friction means in which both of the first and second friction means are in an engaged state during a shifting transition period for varying the speed ratio.

The first hydraulic means may comprise a first valve having a variable valve position between a first position for supplying hydraulic pressure for the first friction means for establishing engagement and a second position for draining pressure in the first friction means for releasing engagement, and a first electromagnetic valve connected to the first valve for controlling a hydraulic first control pressure to be supplied to the first valve in response to the first control signal for operating the first valve to one of the first and second positions, and a second hydraulic means comprises a second valve having variable valve positions between a first position for supplying hydraulic pressure for the second friction means for establishing engagement and a second position for draining pressure in the second friction means for releasing engagement, and a second electromagnetic valve connected to the second valve for controlling hydraulic second pressure to be supplied for the second valve in response to the second control signal for operating the second valve to one of the first and second positions. Also, the first valve may comprise a shift valve for causing a variation in a transmission speed ratio between an adjacent pair of transmission speed ratios, and the second valve comprises a timing control valve operable with the given delay period. Furthermore, the control network may include a vehicle speed sensor means for providing a vehicle speed data, and the control network derives the given delay period depending upon the vehicle speed data. The given delay period is expanded according to increasing vehicle speed.

The first and second friction means establish one speed ratio in combination with the engaged state of the first friction element and the released state of the second friction element, and the other speed ratio in combination with the released state of the first friction element and the engaged state of the second friction element. The first friction means may be a clutch engaged in response to supply of a line pressure from the first hydraulic means and released in response to draining of the line pressure, and the second friction means is a brake released in response to supply of a line pressure from the second hydraulic means and engaged in response to draining of the line pressure, a first combination of the released state of the first friction means and the engaged state of the second friction means establishes the one speed ratio and a second combination of the engaged state of the first friction means and the released state of the second friction means establishes the other speed ratio which is a higher speed ratio than the one speed ratio.

The first and second friction means may establish a third combination in which both are maintained in the engaged state, the third combination being established during the shifting transition. The second hydraulic means may include a first drain path connected to the first valve and provided with a first flow restriction orifice and a second drain path with a second flow restriction orifice, and the second valve establishing fluid communication between the second friction means and the first drain path at the first position for draining line pressure in the second friction means while the first valve is in the second position, and between the second friction means and the second drain path at the second position for draining line pressure in the second friction means therethrough. In such case, the control network is responsive to a down-shifting demand for a shifting transmission speed ratio from the other speed ratio to the one speed ratio for outputting the first control signal for shifting the first valve at the second position in response to the down-shifting demand and second control signal for maintaining the second valve at the first position for a given period and subsequently for shifting the second valve at the second position after expiration of the given delay period so that a flow restriction magnitude in draining line pressure in the second friction element is varied in two stages during a shifting transition period.

BRIEF DESCRIPTION OF THE DRAWINGS

The present invention will be understood from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
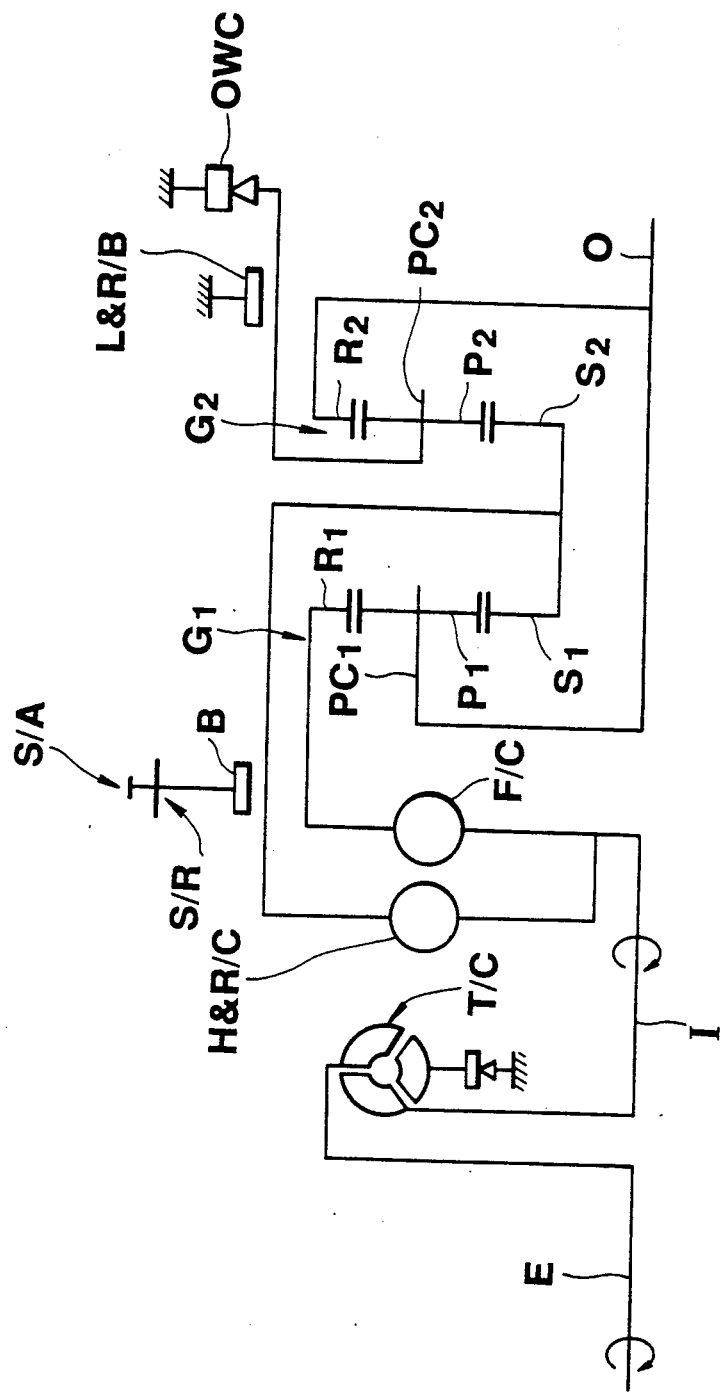
FIG. 1 is a skeleton diagram showing an arrangement of components in an automatic power transmission, for which the preferred embodiment of a shift control system, according to the present invention is applicable.

Referring now to the drawings, FIG. 1 is a skeleton diagram showing an automatic power transmission for an automotive vehicle, which transmission has a capability of transmission speed variation over three forward speed ratios and a single reverse speed ratio. The automatic power transmission includes a torque converter T/C connected to an output shaft E of an automotive internal combustion engine (not shown). The torque converter T/C transmits the driving torque input from the engine output shaft E to an input shaft I. The automatic power transmission also has an output shaft O which is connected to a final drive device for transmitting the driving torque to the latter for driving driving wheels.

The automatic power transmission includes a first sun-and-planetary gear set $G_1$, a second sun-and-planetary gear set $G_2$, a high and reverse clutch H R/C, a forward clutch F/C, a band brake B, a low and reverse brake L R/B, and a one way clutch OWC. The first sun-and-planetary gear set $G_1$ includes a sun gear $S_1$, a ring gear $R_1$, pinions $P_1$ which mesh both of the sun gear $S_1$ and the ring gear $R_1$, and a pinion carrier $PC_1$. On the other hand, the second sun-and-planetary gear set $G_2$ has a sun gear $S_2$, a ring gear $R_2$, pinions $P_2$ which mesh both of the sun gear $S_2$ and the ring gear $R_2$, and a pinion carrier $PC_2$. The aforementioned first and second sun-and-planetary gear sets $G_1$ and $G_2$ form a power transmission network of the automatic power transmission.

The power transmission network as set forth above controls the rotating states of respective components, i.e. sun gears $S_1$ and $S_2$, ring gears $R_1$ and $R_2$, pinions $P_1$ and $P_2$, and pinion carriers $PC_1$ and $PC_2$ for establishing various speed ratios, in combination. In order to establish various speed ratios, high and reverse clutches H R/C, the forward clutch F/C, the band brake B, the low and reverse brake L R/B and the one-way clutch OWC are operated in combination. By operating these controlling components, the rotation speed of the output shaft O relative to the rotation speed of the input shaft I can be adjusted for establishing three forward speed ratios and single reverse speed ratio.

Figure 2:
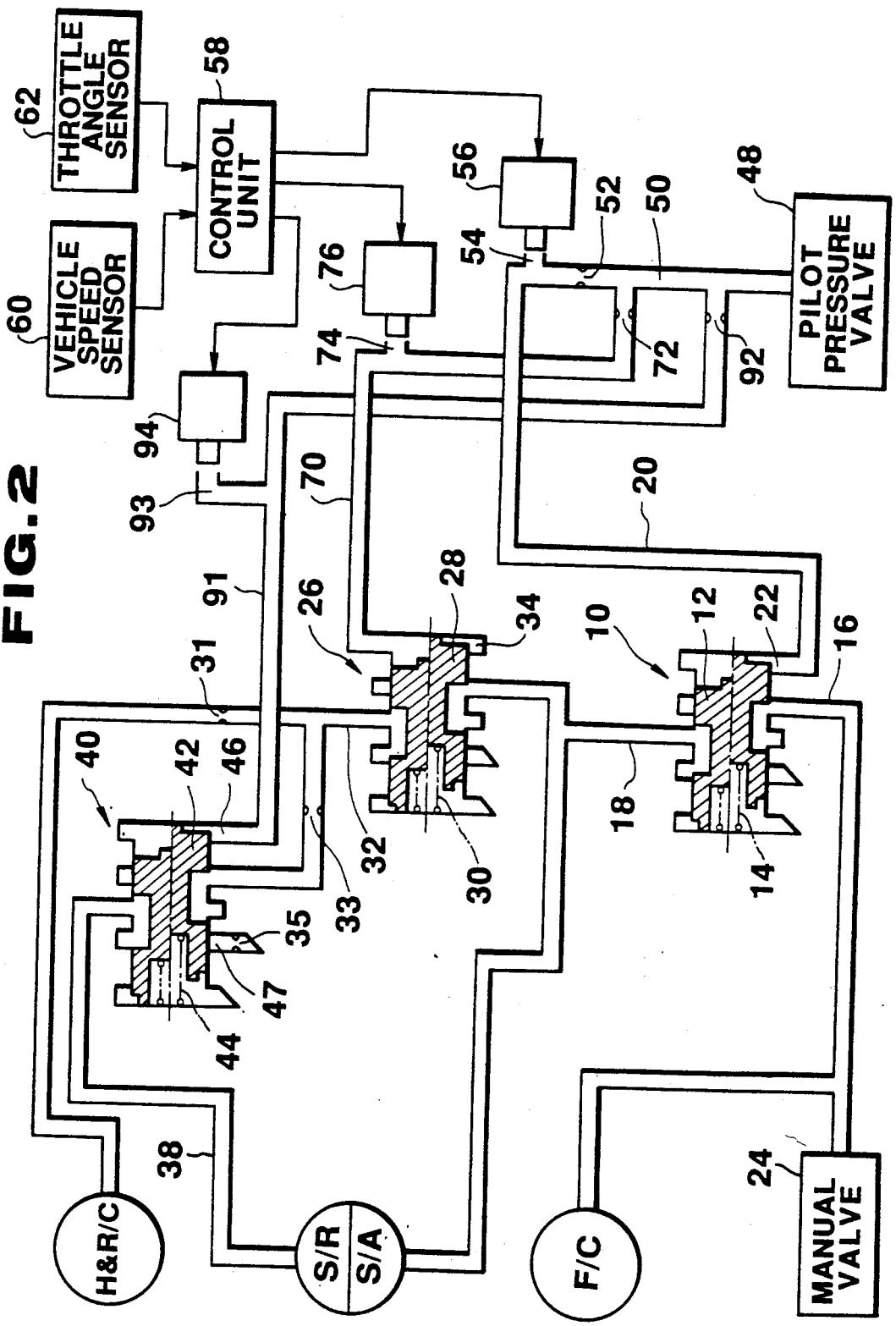
FIG. 2 is a schematic diagram of a hydraulic circuit of the preferred embodiment of the shift control system for the automatic power transmission according to the present invention.

FIG. 2 shows a hydraulic circuit employed in the shown embodiment of the automatic power transmission incorporating the preferred embodiment of the shift control system according to the invention. A 1-2 shift valve 10 has a valve spool 12 biased by a bias spring 14. In the manner of illustration in FIG. 2, the lower half of the illustrated 1-2 shift valve 10 shows the valve spool 12 placed for established fluid communication between pressure lines 16 and 18, in which the pressure line 18 serves as a pressure source line for feeding line pressure. On the other hand, the upper half shows the valve spool 12 placed for draining the pressure line 18. The 1-2 shift valve 10 also has a control port 22 connected to a control line 20 for controlling the position of the valve spool 12 between the positions illustrated at the upper and lower halves of FIG. 2. Namely, the position of the valve spool 12 is determined by equilibrium of the spring force of the spring 14 and the control pressure introduced into the control port 22. The pressure line 16 constantly feeds line pressure from a manual valve 24 whenever any one of the forward drive speed ratios is selected. The pressure line 16 is also connected to the forward clutch F/C.

A 2-3 shift valve 26 has a valve spool 28 and a bias spring 30 biasing the valve spool. The lower half of the 2-3 shift valve 26 in FIG. 2 shows the valve spool 28 placed for establishing fluid communication between the pressure lines 18 and 32 which will be hereafter referred to as a "first line." On the other hand, at the position illustrated at the upper half of FIG. 2, the first line 32 is drained. The 2-3 shift valve 26 has a port 34 connected a line 70, through which a control pressure is supplied. The position of the valve spool 28 is adjusted by the force balance of the spring force of the bias spring 30 and the control pressure to be introduced through the port 34.

The pressure line 18 is also connected to a servo apply chamber S/A for engaging the band brake B. On the other hand, the line 32 is also connected to the high and reverse clutch H R/C which serves as a first friction element. The line 32 is further connected to a timing control valve 40. The line 32 is branched and connected to the high and reverse clutch H R/C and the timing control valve 40 via branch lines. For respective branch lines, flow restriction orifices 31 and 33 are provided.

The timing control valve 40 has a valve spool 42 and a bias spring 44 biasing the valve spool. The valve spool 42 is placed at the position illustrated at the lower half of FIG. 2, for establishing fluid communication between pressure lines 32 and 38. On the other hand, when the valve spool 42 is placed in the position illustrated in the upper half in FIG. 2, the line 38 is blocked from fluid communication with the line 32 and drained via a drain port 47. A flow restriction orifice 35 is provided in the drain port. The timing control valve 40 has a control port 46 connected to a control line 91 to receive therethrough a control pressure so that the valve spool 42 is placed at a position where the forces balance between the spring force of the bias spring 44 and the hydraulic pressure introduced through the control port 46. The line 38 is connected to a servo release chamber S/R for releasing the band brake B as a second friction element.

It should be noted that the servo release chamber S/R has a greater effective area on which the line pressure acts, than that of the servo apply chamber S/A. Therefore, whenever the line pressure is introduced into the servo release chamber S/R, the band brake B is always placed at released position.

The control line 20 connected to the control port 22 of the 1-2 shift valve 10 is connected to a pilot valve 48 which modulates a constant pressure and supplies the modulated constant pressure via a pilot line 50 and via a flow restriction orifice 52. A 1-2 solenoid valve 56 is associated with a port 54 provided in the control line 20. The 1-2 solenoid valve 56 is connected to a microprocessor-based control unit 58 to receive therefrom a 1-2 control signal to be selectively operated between shutting-off and opening the port 54. When the port 54 is held in a shut-off position, the constant pressure of the pilot valve 48 is supplied to the control port 22 of the 1-2 shift valve 10 as the control pressure. On the other hand, when the 1-2 solenoid valve 56 is held open, the constant pressure from the pilot valve 48 is directly drained. In order to control the 1-2 solenoid valve 56, the microprocessor-based control unit 58 is provided. The control unit 58 supplies a 1-2 shift control signal to the 1-2 solenoid valve 56 for controlling valve position between the shut-off position and the open position.

The control line 70 connected to the control port 34 of the 2-3 shift valve 26 is connected to the pilot valve 48 via the pilot line 50 and a flow restriction orifice 72. A 2-3 solenoid valve 76 is associated with a port 74 defined in the control line 70. The 2-3 solenoid valve 75 is connected to the control unit 58 to be controlled by the valve position between the shut-off position and the open position by a 2-3 shift control valve 76 provided from the control unit 58. When the 2-3 solenoid valve 76 is energized, the port 74 is maintained opened in order to drain the control pressure. On the other hand, when the 2-3 solenoid valve 76 is held deenergized, it shuts off the port 74 so that the control pressure from the pilot pressure valve 48 is supplied to the control port 34.

The control line 91 connected to the control port 46 of the timing control valve 40 is connected to the pilot valve 48 via the pilot line 50 and a flow restriction orifice 92. A timing solenoid valve 94 is associated with a port 93 defined in the control line 91. The timing solenoid valve 94 is connected to the control unit 58 to control the valve position between the shut-off position and open position by a timing control signal provided from the control unit 58. When the timing solenoid valve 94 is energized, it maintains the port 93 opened in order to drain the control pressure. On the other hand, when the timing solenoid valve 94 is held deenergized, it shuts-off the port 93 so that the control pressure from the pilot pressure valve 48 is supplied to the control port 46.

The control unit 58 is connected to a vehicle speed sensor 60 and a throttle angle sensor 62 to receive therefrom vehicle speed data and throttle angle data, respectively. The control unit 58 processes received data for deriving the 1-2 shift control signal, the 2-3 shift control signal, and the timing control signal on the basis thereof for controlling the 1-2 solenoid valve 56, the 2-3 solenoid valve 76, and the timing solenoid valve 94.

In the operation, when all of the 1-2 solenoid valve 56, the 2-3 solenoid valve 76 and the timing solenoid valve 94 are maintained at the shut-off position, the control pressure modulated by the pilot pressure valve 48 is supplied to the respective one of the 1-2 shift valve 10, the 2-3 shift valve 26, and the timing control valve 40 for placing the valve spools 12, 28 and 42 at respective positions as illustrated in the upper halves of FIG. 2. At this position, the line pressure for the servo apply chamber S/A via the line 18 and for the high and reverse clutch H R/C is drained. Also, the line pressure for the servo release chamber S/R is drained. Therefore, the line pressure is supplied only for the forward clutch F/C. Therefore, the automatic power transmission is shifted at the first speed ratio.

If the 1-2 solenoid valve 56 is shifted to an open position for draining the control pressure in the control line 20, the valve spool 12 of the 1-2 shift valve 10 is shifted from the position of the upper half to the position of the lower half. Therefore, the line 16 from the manual valve 24 is communicated with the line 18. As a result, the line pressure is supplied to the servo apply chamber S/A via the line 18. This causes the band brake B to be operated in the engaged position. Therefore, the second speed ratio of the automatic power transmission is established.

Figure 3:
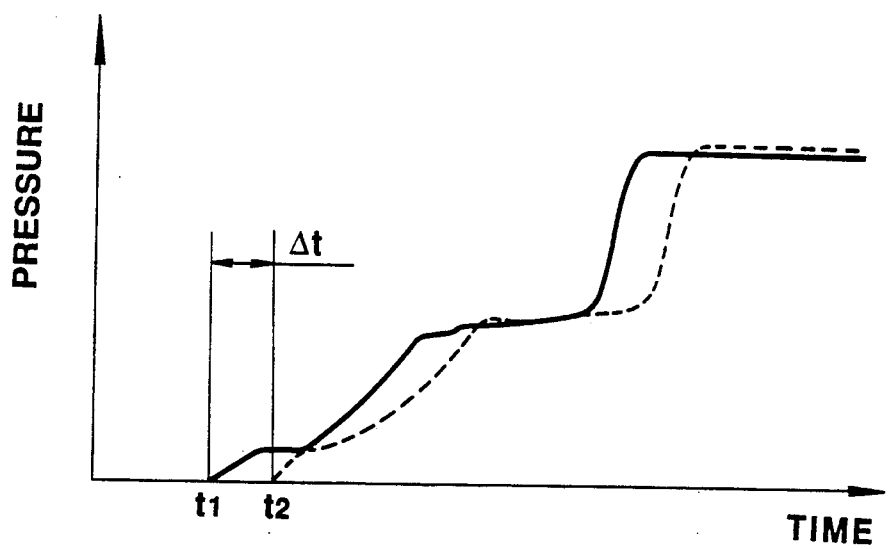
FIG. 3 is a chart showing characteristics of rising hydraulic pressure in the preferred embodiment of the shift control system.

Subsequently, if the 2-3 solenoid valve 76 is shifted into an open position, the control pressure in the control line 70 is drained. Therefore, the valve spool 28 of the 2-3 shift valve 26 is shifted from the position of the upper half to the position of the position of the lower half. As a result, the line 18 and the line 32 is communicated via the 2-3 shift valve 26. At this time, since the timing solenoid valve 94 is maintained at the shut-off position to place the valve spool 42 of the timing control valve 40, communication between the line 33 and the line 38 is maintained at a blocked position. Therefore, the line pressure is supplied only for the high and reverse clutch H R/C via the 2-3 shift valve 26. Therefore, the pressure in the high and reverse clutch H R/C increases as illustrated by a solid line in FIG. 3 from a time $t_1$. The control unit 58 then supplies the timing control signal at a time $t_2$ with a given lag time $\Delta t$ from the time $t_1$, for operating the timing solenoid valve 94 from the shut-off position to the open position. As a result, the control pressure in the control line 91 is drained via the port 93. Therefore, the valve spool 42 of the timing valve 40 is shifted from the position of the upper half to the position of the lower half to establish fluid communication between the lines 33 and 38 thereacross. Therefore, the line pressure is started to be supplied to the servo release chamber S/R. Therefore, the pressure in the servo release chamber S/R increases from the time $t_2$ as illustrated by the broken line in FIG. 3. Therefore, the high and reverse clutch H R/C is engaged before the band brake B is released. As set forth, since the delay time $\Delta t$ is provided in the operating timing of the 2-3 shift valve 76 and the timing valve 94, it can be assured to provide a delay time from establishing engagement of the high and reverse clutch H R/C to releasing of the band brake B. Therefore, the band brake B is released after a certain overlapping period in which both of the high and reverse clutch and the band brake are held engaged. This assures prevention of engine acceleration at no load condition and thus can provide better shift feeling.

It should be appreciated that the given delay time $\Delta t$ may be set to vary according to variation of the vehicle speed. Namely, it is preferable to set the given delay time $\Delta t$ to be expanded according to increasing of the vehicle speed.

Upon 3-2 down-shifting, a delay time may be provided for the timing control valve 40 relative to the shifting timing of the 2-3 shift valve 26 so that the orifice effect can be varied upon draining of the pressure in the servo release chamber S/R. Namely, when the 2-3 shift valve 26 is shifted from the position of the lower half to the position of the upper half, the line pressure in the line 32 is drained. Therefore, the line pressure in the high and reverse clutch H R/C can be drained through the 2-3 shift valve 26. At this time, the flow restriction orifice 31 is active for providing an orifice or flow restriction effect. At the same time, the pressure in the servo release chamber S/R is drained via the line 38, the timing control valve 40 and the line 32. The flow restriction orifice 33 is then effective for providing the orifice effect. With the given delay time, the valve spool 42 of the timing control valve 40 is shifted from the position of the lower half to the position of the upper half. By this the fluid communication between the line 38 and the port 47 is established for draining the pressure. Therefore, the flow restriction orifice 35 becomes active for providing an orifice effect against the fluid flow. By switching the active orifice between the orifices 33 and 35 for providing different orifice effect, shifting timing of the transmission speed ratio can be adjusted.

It should be appreciated that, if the valve position of the the 2-3 shift valve is controlled hydraulically instead of electrically, the control unit 58 may control the valve position by detecting shifting of the 2-3 shifting valve and by providing the timing control signal for operating the timing control solenoid 94 after a given delay time from occurrence of actual shifting of the 2-3 shift valve.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, the shown embodiment has been directed to the automatic power transmission having forward three speed ratios and reverse single speed ratio, the present invention is applicable for any number of stages of speed ratios. Therefore, the type of the automatic power transmission to apply the present invention should not be appreciated to that specified in the foregoing embodiment.

What is claimed is:

1. A shift control system for an automotive power transmission comprising:

gear means including a plurality of gears which have variable rotating states, for establishing a plurality of transmission speed ratios;

a first friction means, associated with said gear means and having variable states between an engaged state and a released state, for varying a rotational state of said gears;

a second friction means, associated with said gear means in cooperation with said first friction means and having variable states between said engaged state and said released state, for establishing a plurality of speed ratios in combination with the states of said first friction means;

a first hydraulic means, associated with said first friction means, for varying a state thereof between said engaged state and said released state;

a second hydraulic means, associated with said second friction means, for varying a state thereof between said engaged state and said released state; and an electronic control network monitoring preselected transmission shifting control parameters and selecting one of said transmission speed ratios adapted to the vehicle driving condition represented by said control parameters for producing a first control signal for establishing engagement of said first friction means, and a second control signal for releasing said second friction means, and said control network being responsive to a downshifting command commanding downshifting of a transmission speed ratio from a higher speed ratio to a lower speed ratio across a neutral state, for supplying a second control signal for said second hydraulic means for operating said second friction means with a given delay period from supply of said first control signal so as to provide an overlapping state when said first and second friction means are in an engaged state during shifting during a transition period for varying the speed ratio.

2. A shift control system as set forth in claim 1, wherein said first hydraulic means comprises a first valve with a variable valve position between a first position for supplying hydraulic pressure for said first friction means for establishing engagement and a second position for draining pressure in said first friction means for releasing engagement, and a first electromagnetic valve connected to said first valve for controlling a first hydraulic control pressure to be supplied to said first valve in response to said first control signal for operating said first valve to one of said first and second positions and a second hydraulic means comprises a second valve with a variable valve position between a first position for supplying a second hydraulic pressure for said second friction means for establishing engagement and a second position for draining pressure in said second friction means for releasing engagement, and a second electromagnetic valve connected to said second valve for controlling said second hydraulic pressure to be supplied for said second valve in response to said second control signal for operating said second valve to one of said first and second positions.

3. A shift control system as set forth in claim 1, wherein said first valve comprises a shift valve for causing variation of a transmission speed ratio between adjacent two transmission speed ratios, and said second valve comprises a timing control valve operable with said given delay period.

4. A shift control system as set forth in claim 1, wherein said control network includes a vehicle speed sensor means for providing vehicle speed data, and said control network derives said given delay period depending upon said vehicle speed data.

5. A shift control system as set forth in claim 1, wherein said first and second friction means establishes one speed ratio in combination of said engaged state of said first friction element and said released state of said second friction element, and the other speed ratio in combination of said released state of said first friction element and said engaged state of said second friction element.

6. A shift control system as set forth in claim 1, wherein said first friction means is a clutch engaged in response to supply of a line pressure from said first hydraulic means and released in response to draining of said line pressure, and said second friction means is a brake released in response to supply of a line pressure from said second hydraulic means and engaged in response to draining of said line pressure, a first combination of said released state of said first friction means and said engaged state of said second friction means establishes said one speed ratio and a second combination of said engaged state of said first friction means and said released state of said second friction means establishes the other speed ratio which are higher speed ratio than said one speed ratio.

7. A shift control system as set forth in claim 6, wherein said first and second friction means establish a third combination in which both are maintained in said engaged state, said third combination being established during said shifting transition.

8. A shift control system as set forth in claim 7, wherein said first hydraulic means comprises a first valve having variable valve positions between a first position for supplying hydraulic pressure for said first friction means for establishing engagement and a second position for draining pressure in said first friction means for releasing engagement, and a first electromagnetic valve connected to said first valve for controlling a first hydraulic control pressure to be supplied to said first valve in response to said first control signal for operating said first valve to one of said first and second positions and a second hydraulic means comprises a second valve with variable valve positions between a first position for supplying hydraulic pressure for said second friction means for establishing engagement and a second position for draining pressure in said second friction means for releasing engagement, and a second electromagnetic valve connected to said second valve for controlling second hydraulic pressure to be supplied for said second valve in response to said second control signal for operating said second valve to one of said first and second positions.

9. A shift control system as set forth in claim 8, wherein said second hydraulic means includes a first drain path connected to said first valve and provided with a first flow restriction orifice and a second drain path with a second flow restriction orifice, said second valve establishing fluid communication between said second friction means and said first drain path at said first position for draining line pressure in said second friction means while said first valve is in said second position, and between said second friction means and said second drain path at said second position for draining line pressure in said second friction means through there.

10. A shift control system as set forth in claim 9, wherein said control network is responsive to a downshifting demand for shifting a transmission speed ratio from the other speed ratio to said one speed ratio for outputting said first control signal for shifting said first valve at said second position in response to said downshifting demand and second control signal for maintaining said second valve at said first position for a given period and subsequently for shifting said second valve at said second position after expiration of said given period so that flow restriction magnitude in draining line pressure in said second friction element is varied in two stage during shifting transition period.

11. A shift control system for an automotive power transmission comprising:

gear means including a plurality of gears which have variable rotating states, for establishing a plurality of transmission speed ratios;

a first friction means, associated with said gear means and having variable states between an engaged state and a released state, for varying a rotational state of said gears;

a second friction means, associated with said gear means in cooperation with said first friction means and having variable states between said engaged state and said released state, for establishing a plurality of speed ratios in combination with states of said first friction means;

a first hydraulic means, associated with said first friction means, for varying a state thereof between said engaged state and said released state;

a second hydraulic means, associated with said second friction means, for varying a state thereof between said engaged state and said released state; and an electronic control network monitoring preselected transmission shifting control parameters and selecting one of said transmission speed ratios adapted to the vehicle driving condition represented by said control parameters for producing a first control signal for establishing engagement of said first friction means, control signal for releasing said second friction means, and said second said control network being responsive to a downshifting command commanding downshifting of a transmission speed ratio from a higher speed ratio to a lower speed ratio across a neutral state, for supplying a second control signal for said second hydraulic means for operating said second friction means with a given delay period from supply of said first control signal so as to provide an overlapping state when said first and second friction means are in an engaged state during shifting a transition period for varying the speed ratio, said control network including a vehicle speed sensor means for providing a vehicle speed data, and said control network deriving said given delay period depending upon said vehicle speed data in such a manner that said given delay period is expanded according to increasing of the vehicle speed.

* * * * *